(12) United States Patent
Fielder

(10) Patent No.: US 6,210,096 B1
(45) Date of Patent: Apr. 3, 2001

(54) PERSONAL WATERCRAFT LOADING APPARATUS

(76) Inventor: Ricky J. Fielder, 5580 Vanderbilt Rd., Old Hickory, TN (US) 37138

( * ) Notice: Subject to any disclaimer, the term of this patent is extended or adjusted under 35 U.S.C. 154(b) by 0 days.

(21) Appl. No.: 09/356,628

(22) Filed: Jul. 19, 1999

(51) Int. Cl.⁷ .................................................. B65G 67/02
(52) U.S. Cl. ........................................... 414/522; 414/538
(58) Field of Search ..................................... 414/538, 522

(56) References Cited

U.S. PATENT DOCUMENTS

| | | | |
|---|---|---|---|
| 2,485,793 | * 10/1949 | Vassar | 414/477 |
| 4,626,162 | * 12/1986 | Parisi | 414/479 |
| 4,960,356 | * 10/1990 | Wrenn | 414/537 |
| 5,184,913 | * 2/1993 | Meriwether | 414/477 X |
| 5,244,335 | * 9/1993 | Johns | 414/537 |
| 5,249,910 | * 10/1993 | Ball | 414/538 |
| 5,257,728 | 11/1993 | Gibson . | |
| 5,492,454 | 2/1996 | Colyer . | |
| 5,509,639 | * 4/1996 | Ellis | 414/538 X |
| 5,513,941 | * 5/1996 | Kulas et al. | 414/522 |
| 5,542,810 | 8/1996 | Florus . | |
| 5,603,600 | * 2/1997 | Egan et al. | 414/538 X |
| 5,752,799 | 5/1998 | Carey et al. . | |
| 5,810,546 | 9/1998 | Schmoling . | |
| 5,863,173 | 1/1999 | Bremner . | |
| 5,882,170 | 6/1999 | Walton . | |
| 5,897,284 | * 4/1999 | Ardohain | 414/522 |
| 5,934,863 | * 8/1999 | Beck | 414/538 |

OTHER PUBLICATIONS

Splash Magazine, p. 122 (Jun. 1996).
Watercraft World, p. 155 (Jul. 1996).
Personal Watercraft Illustrated, p. 141 (Jun. 1997).
Watercraft World, p. 183 (Jul. 1996).
Declaration of Ricky J. Fielder (not prior art).
Collection of advertising literature regarding the roller Ramp device manufactured by monsoon Industries, LLC the appears to be constructed in accordance with the teachings of the Schmoling U.S. Patent 5,810,546.

* cited by examiner

Primary Examiner—Steven A. Bratlie
(74) Attorney, Agent, or Firm—Waddey & Patterson

(57) ABSTRACT

Methods and apparatus are provided for loading a personal watercraft in a bed of a truck. A skid is mounted on the bed of the truck with a mounting apparatus. Low friction bearings, preferably sheets of ultra high molecular weight plastic material, are provided between the skid and the bed of the truck and between the skid and the mounting brackets. The skid itself carries low friction bearings, again preferably in the form of components made of plastic material, so that the watercraft can easily slide up on to the skid. The skid is extended rearward in a telescoping fashion, and then the watercraft is brought toward the skid with the aid of a winch. The winch then pulls the watercraft onto the skid and pulls the skid and the watercraft into the bed of the truck.

19 Claims, 5 Drawing Sheets

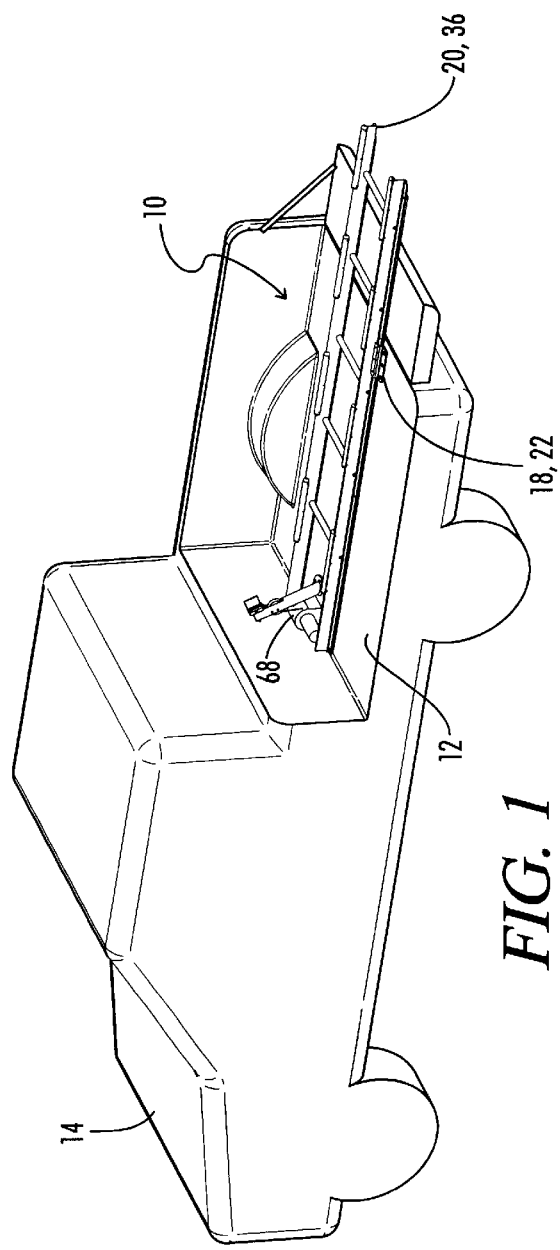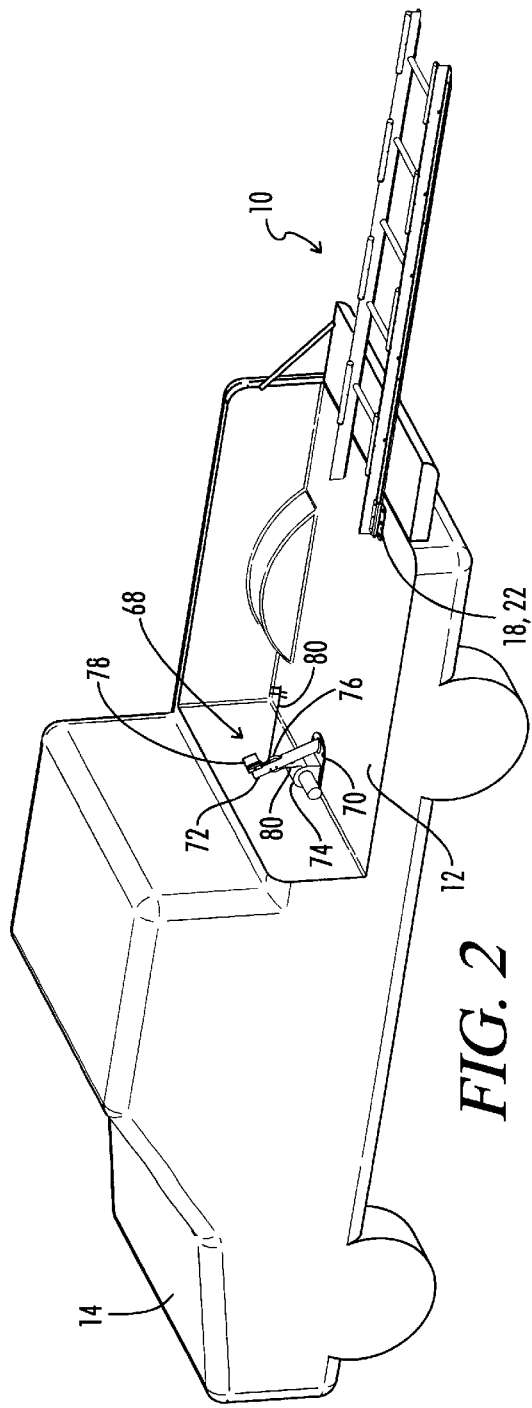

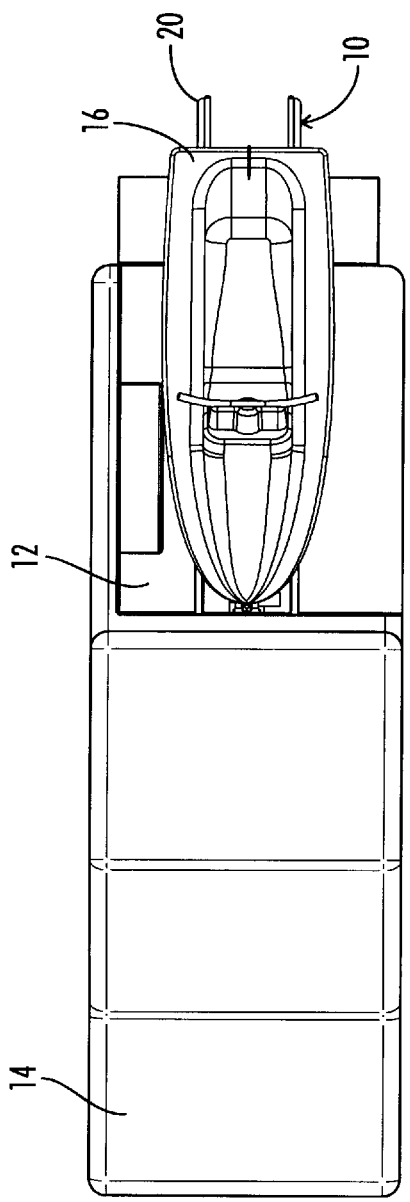
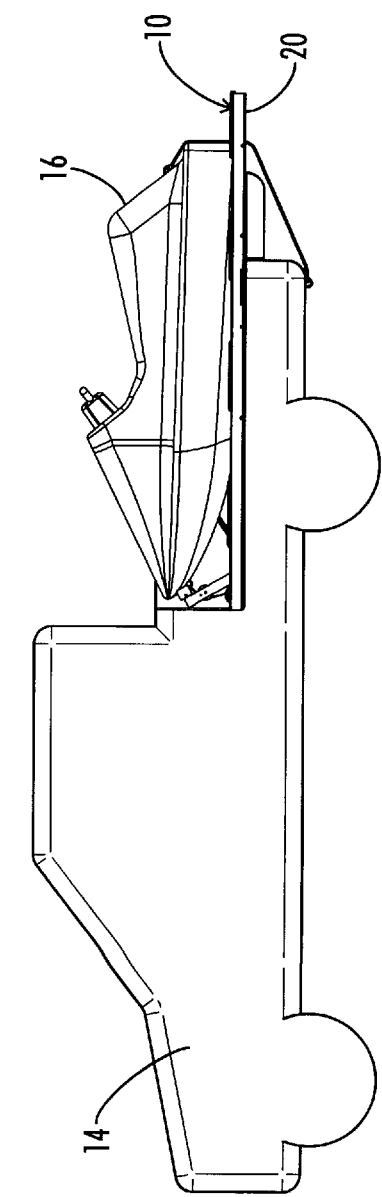
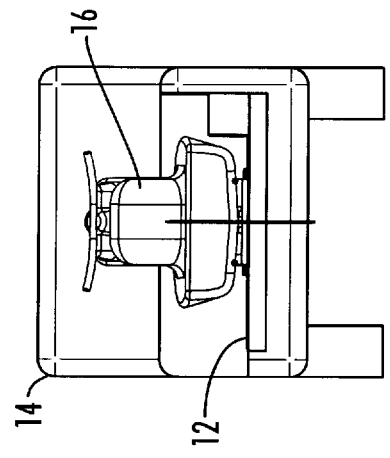

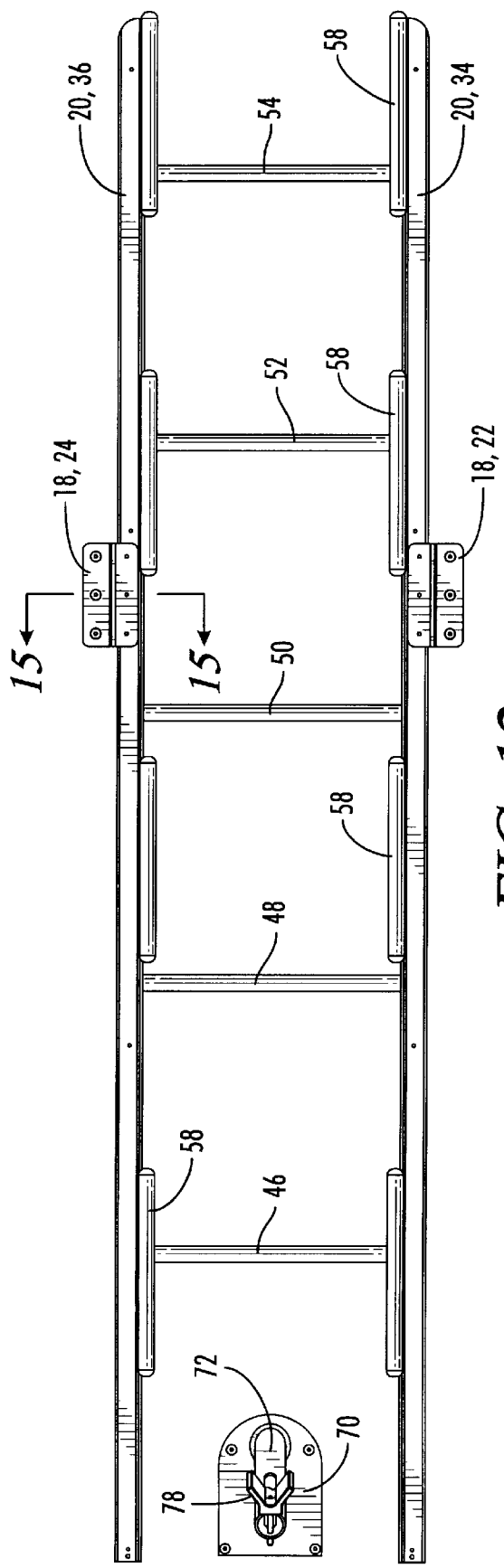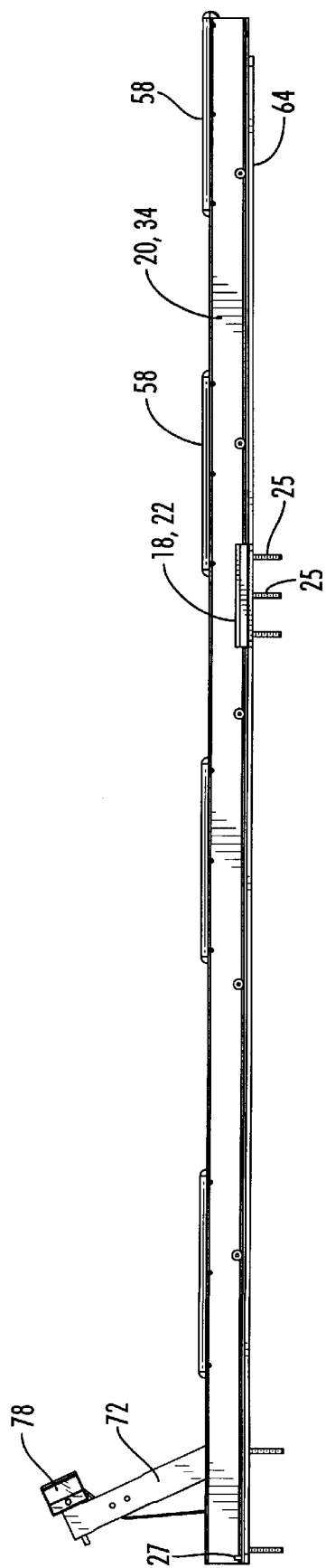

PERSONAL WATERCRAFT LOADING APPARATUS

BACKGROUND OF THE INVENTION

1. Field of the Invention

The present invention relates generally to apparatus for loading articles in the bed of the truck, and more particularly, but not by way of limitation, to apparatus for loading a personal watercraft in the bed of a pickup truck.

2. Description of the Prior Art

In recent years the popularity of personal watercraft has led to the need for convenient means for loading and transporting the watercraft from the home to the body of water upon which the watercraft is to be used.

Many such apparatus have been constructed for the particular purpose of loading such a watercraft in the bed of a conventional pickup truck.

One such apparatus is shown in U.S. Pat. No. 5,542,810 to Florus. The Florus apparatus includes a ramp which extends from the bed of the truck into the body of water. A winch is used to pull the watercraft up the ramp onto a rack located within the bed of the truck. Then the ramp is disconnected from the rack for transport.

Another such device is that marketed by Monsoon Industries, LLC of Clinton Township, Michigan under the brand Roller Ramp. The Monsoon Roller Ramp includes a two-part ramp. A first part of the ramp is fixedly mounted in the bed of the truck. A second part of the ramp may be extended rearwardly from the first part and pivoted downward into the body of water. Then, the watercraft is pulled up the second ramp section on to the fixed first ramp section. Then the second ramp section can be slid into a retracted storage position below the fixed first ramp section.

The structure disclosed in U.S. Pat. No. 5,810,546 to Schmoling appears to be similar to that of the Monsoon Roller Ramp just described.

Both the devices just described are complex in their construction and use, and they require that the portion of the loading ramp which extends into the lake be manually retracted or disassembled after the watercraft has been loaded.

Thus, it is seen that there is still a need for an improved watercraft loading apparatus which is simple of construction, economical to manufacture, and easy to use.

SUMMARY OF THE INVENTION

An apparatus is provided for loading and unloading a personal watercraft or like article onto and from the bed of a truck or a flat bed of a trailer. The apparatus includes a skid mount connected to the truck. A skid is provided which is movable relative to the skid mount between an extended position and a retracted position. The extended position enables the watercraft to be received upon the skid from a body of water. In the retracted position, the watercraft is supported upon the skid within the bed of a truck. In its extended position, the skid is cantilevered from a rear end of the bed of the truck, generally parallel to the bed of the truck.

The skid is preferably constructed to be received by a skid mount on the bed of the truck and includes first and second rails, each having an underside and a topside. A plurality of cross pieces are connected between the first and second rails. First and second strips of friction reducing material are mounted on the undersides of the first and second rails for engaging the bed of the truck so that the skid can slide upon the bed of the truck. First and second friction reducing supports are attached to the topsides of the first and second rails for engaging the article to be loaded so that the article can slide upon the rails.

A method of loading a personal watercraft using the apparatus described includes providing such an apparatus and then sliding the skid rearward relative to the truck to an extended position extending past a rear end of a truck. Then a winch line from the winch is connected to the watercraft and retracted thereby pulling the watercraft onto the skid and pulling the skid and the watercraft onto the truck so that the watercraft is supported by the skid and the skid is supported by the truck.

It is therefore, a general object of the present invention to provide methods and apparatus for loading an article such as a watercraft onto the bed of a truck or onto a flat bed of a trailer or the like.

Another object of the present invention is the provision of an apparatus which allows one person to easily load and unload a personal watercraft from the bed of a pickup truck.

Still another object of the present invention is the provision of a watercraft loading apparatus which is simple and economical to manufacture.

Still another object of the present invention is the provision of an apparatus which allows watercraft to be safely loaded within the bed of a pickup truck.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an isometric view showing the apparatus of the present invention mounted in the bed of a pickup truck with the apparatus in a retracted position.

FIG. 2 is a view similar to FIG. 1 showing the apparatus in the extended position.

FIG. 3 is a plan view showing a personal watercraft loaded upon the loading apparatus of the present invention within the bed of a pickup truck.

FIG. 4 is a side elevation view of the apparatus of FIG. 3.

FIG. 5 is a rear end elevation view of the apparatus of FIG. 3.

FIG. 6 is a side elevation view showing a pickup truck carrying a personal watercraft using the apparatus of the present invention. The truck has been backed down a ramp to a position adjacent a body of water into which the personal watercraft is to be unloaded.

FIG. 7 is a view similar to FIG. 6 showing the watercraft in a partially unloaded position with the skid fully extended from the rear of the truck.

FIG. 8 is a view similar to FIG. 6 showing the watercraft fully unloaded into the water.

In FIG. 9, the watercraft is still located within the bed of the pickup truck.

FIG. 10 shows the watercraft partially unloaded corresponding to FIG. 7.

FIG. 11 shows the watercraft fully unloaded and floating on the body of water, corresponding to FIG. 8.

FIG. 12 is a plan view of the components of the loading apparatus of the present invention corresponding to the fully retracted position of the skid as shown in FIG. 1.

FIG. 13 is a side elevation view of the components shown in FIG. 12.

DETAILED DESCRIPTION OF THE DRAWINGS

Figure 6:
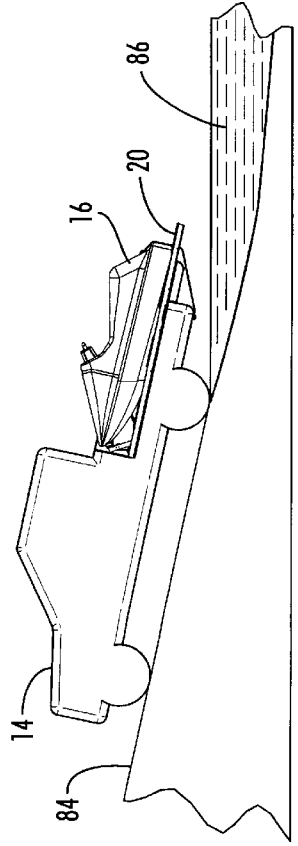
FIGS. 6, 7 and 8 comprise a sequential series of figures as follows.

Referring now the drawings and particularly to FIG. 1, the apparatus of the present invention is shown and generally designated by the numeral 10. The apparatus 10 is mounted in the bed 12 of a conventional pickup truck 14. As is illustrated in FIGS. 3–11, the apparatus 10 provides an apparatus for loading a personal watercraft 16 onto the bed 12 of the truck 14.

The apparatus 10 includes a skid mount 18 constructed to be connected to the bed of the truck and to receive a skid 20 therein. As best seen in FIG. 12, the skid mount 18 includes first and second mounting brackets 22 and 24.

Figure 15:
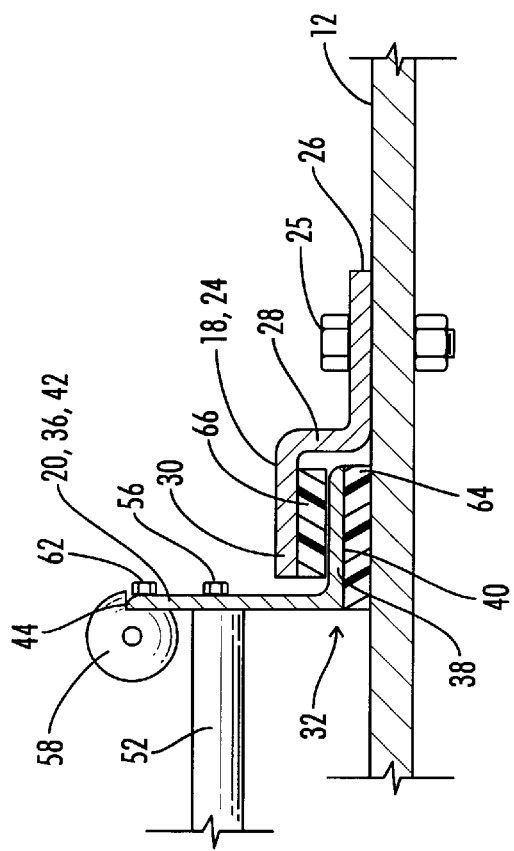
FIG. 15 is a sectioned elevation view taken along line 15—15 of FIG. 12 illustrating the manner in which the rails of the skid are received within the mounting brackets, and also illustrating the friction reducing plastic strips attached to the skid rails and to the mounting brackets.

As best seen in FIG. 15, each of the mounting brackets, such as mounting bracket 24 includes a first horizontal flange 26, a central vertical member 28, and a second horizontal flange 30. The second horizontal flange 30 can be described as a plate 30 spaced from and generally parallel to the bed 12 of the truck to define a slot 32 within which one of the rails of the skid 20 may be slidably received.

The mounting brackets 22 and 24 are preferably attached to the bed 12 by bolts such as 25 extending through the bed 12.

The skid 20 includes first and second rails 34 and 36. Each of the rails is a right angle shaped structural member. The second rail 36 is best shown in FIG. 15. There it is seen that the second rail 36 includes, in its cross-section shape, a first leg 38 extending parallel to the bed 12 of the truck 14 and having an underside 40 of the rail 36 defined thereon. The rail 36 further includes a second leg 42 extending vertically upward so that a top edge 44 thereof can be described as defining a top side 44 of the rail 36.

The skid 20 includes a plurality of cross pieces 46, 48, 50, 52, and 54 extending between and connected to the first and second rails 34 and 36 to form the skid 20. The cross pieces 46 through 54 are preferably constructed from a solid round rod of ultra high molecular weight plastic material. The cross pieces are attached to the vertical legs of the rails 34 and 36 by screws 56 which thread into the end of the cross pieces.

Both the mounting brackets 22 and 24 and the rails 34 and 36 are preferably constructed from aluminum or other corrosion resistant metal.

The fully extended position of the skid 20 is defined by abutment of upward extending bolts 27 (see FIG. 13) attached to the horizontal flanges of the rails 34 and 36, near their forward ends. The upward extending bolts 27 will abut the forward edge of the mounting brackets to limit rearward motion of the skid 20 relative to the mounting brackets.

Figure 17:
FIG. 17 is an end view of the bumper of FIG. 16.
Figure 14:
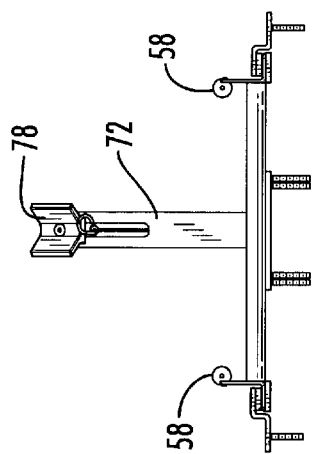
FIG. 14 is a rear end elevation view of the components shown in FIG. 12. It is noted that in FIGS. 12, 13 and 14, the bed of the truck is not shown, but only the components of the loading apparatus are shown as they would be oriented if mounted in the bed of the truck.
Figure 16:
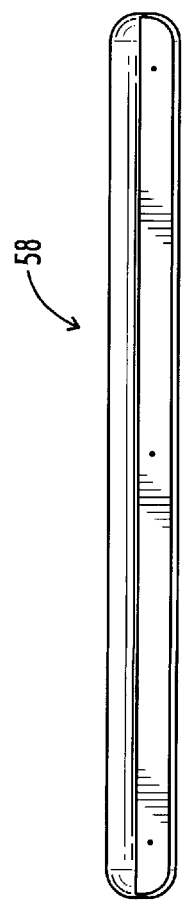
FIG. 16 is a side elevation view of one of the friction reducing bumpers to be mounted on the top edge of the skid rails for receiving the watercraft in sliding engagement upon the bumpers.

Along the top edge 44 of each of the rails 34 and 36, there are mounted several bumpers 58. Each of the bumpers 58 is constructed from a length of round ultra high molecular weight plastic rod as is best shown in FIGS. 16 and 17. Each of the bumpers 58 has a notch 60 formed along its length so that the top edge 44 of one of the rails can be received within the notch 60. The bumpers 58 are attached to the top edge 44 of the rails with screws 62.

The bumpers 58 may be generally described as friction reducing supports 58 attached to the top sides 44 of the first and second rails 34 and 36 s for engaging the watercraft 16 so that the watercraft 16 can slide upon the rails 34 and 36.

As best seen in FIG. 15, each of the rails 34 and 36 has a strip 64 of friction reducing material mounted on the underside 40 of the rail. The strip 64 engages the bed 12 of the truck so that the skid 20 can slide upon the bed 12 of the truck. The strip 64 is preferably constructed from ultra high molecular weight plastic material.

The plastic bearing strip 64 may be generally described as a friction reducing bearing 64 between the skid 20 and the bed 12 of the truck 14.

Similarly, each of the mounting brackets, such as mounting bracket 24 includes a pad 66 of friction reducing material for engaging the horizontal leg 38 of its associated leg 34 or 36. The pads 66 are also preferably ultra high molecular weight plastic material.

The pads 66 and the strips 64 are preferably attached to the mounting brackets and rails, respectively, by the use of screws which are countersunk into the plastic material with the threaded portion of the screw extending into the metallic bracket member or rail.

The pads 66 may be generally described as friction reducing bearings between the skid 20 and the skid mount 18.

The apparatus 10 further includes a winch assembly 68 mounted in the bed 12 of the truck. The entire winch assembly is best seen in FIG. 2. The winch assembly 68 includes a base plate 70 bolted to the bed 12 of the truck 14. A winch post 72 extends upward from the base plate 70 at a forward sloping angle so that an electric winch motor 74 can be located below the post.

The post 72 carries a roller wheel 76 near its upper end. Located on the post 72 above the roller wheel 76 is a V-shaped abutment 78 for receiving a nose portion of the watercraft 16 as seen in FIGS. 3 and 4.

A winch line 80 extends from the winch motor 74 up over the roller wheel 76. As is apparent in FIG. 7, the post and roller wheel 76 extend up to an elevation approximately equal to that of a tow eye or tow connection 82 on the watercraft 16 so that the winch line 80 can extend from the roller wheel 76 of post 72 to the tow connection 82 in a line approximately parallel to the bed 12 of the truck 14.

As used herein, the term ultra high molecular weight plastic refers to that category of relatively hard plastic material suitable for use as a bearing. One example is ultra high molecular weight polyethylene.

There are alternative means by which the skid 20 can be mounted with the bed 12 other than by use of the mounting brackets illustrated. For example, the horizontal flanges of the rails 34 and 36 may have elongated slots formed therein, and a bolt may extend from the bed of the truck through the slot with a suitable head on the bolt so as to retain the rail on the bolt. Then, the rails can slide relative to the bolt.

In another alternative embodiment, the winch does not have to be mounted on the post, although the use of a post is preferred. The winch can be mounted directly on the bed of the truck so that the winch line extends rearward at an upward angle from the winch. The use of a post and a horizontally directed winch line is preferred because that reduces the downward forces exerted on the watercraft 16, thus allowing the sliding motion between the components of the apparatus to occur more freely.

METHODS OF OPERATION

With reference now to FIGS. 6–11, the methods of utilizing the apparatus 10 to load and unload a watercraft will be described.

In FIG. 6, the watercraft 16 is shown in a loaded position in the bed of the truck 14. The truck 14 is schematically illustrated as being located on a downward sloping road or ramp 84 extending into a body of water 86.

In FIG. 6, the truck 14 has backed down the ramp 84 until it is located adjacent the edge of the body of water 86. Then, the winch motor 74 is engaged to slowly release the winch line 80. As this occurs, first the skid 20 will slide backward on the bed 12 of the truck until the skid 20 reaches the fully extended position.

Figure 7:
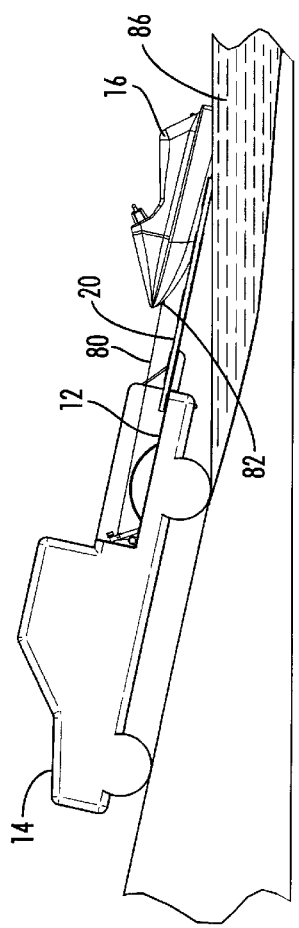

Once the skid 20 has reached its fully extended position as seen in FIG. 7, the watercraft 16 will continue to slide rearward down the rails 34 and 36 of skid 20 and into the body of water 86.

Figure 8:
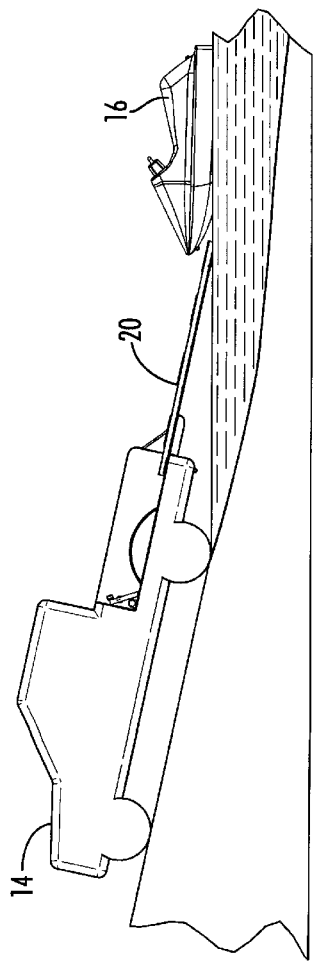
Figure 9:
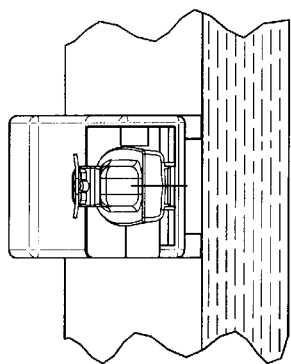
FIGS. 9, 10 and 11 are a sequential series of rear end views corresponding to FIGS. 6–8.
Figure 10:
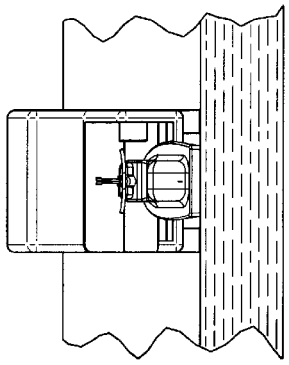
Figure 11:
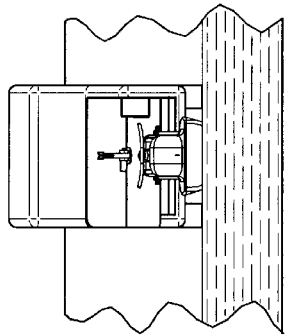

Once the watercraft 16 is floating in the body of water 86 as seen in FIG. 8, the winch line 80 will be disconnected therefrom.

The procedure for reloading the watercraft 16 into the bed 12 of the truck 14 is simply the reverse of that just described.

The truck 14 will be located adjacent the edge of the body of water and the skid 20 will be manually pulled rearward to a fully extended position such as shown in FIG. 8.

Then, the watercraft 16 is brought to a position adjacent the rear end of the skid 20 like that shown in FIG. 8. Then, the winch line 80 is connected to the tow connection 82 on the nose of the watercraft 16 and the winch line 80 is slowly retrieved to pull the watercraft 16 toward the truck.

As the nose of the watercraft 16 first engages the rear end of skid 20, it will exert a downward weight on the rear end of skid 20. Because the skid 20 is cantilevered from the rear end of the truck, this weight being exerted downward on the rear end of the skid will exert a substantial bending force on the skid 20. The skid 20 is retained in place by its sliding engagement with the mounting brackets 22 and 24, and it will be appreciated that when a substantial weight is placed downward on the rear end of the skid 20, this will cause the forward portion of the skid 20 to bind within the mounting brackets 22 and 24. This will greatly increase the frictional resistance to sliding movement of the skid 20 relative to the mounting brackets 22 and 24. The frictional resistance to movement of the watercraft 16 relative to the skid 20, however, is relatively low, because the watercraft 16 will be sliding up onto the plastic bumpers 58 and the plastic cross pieces 46–54.

Thus, when the watercraft 16 initially engages the skid 20, frictional resistance to sliding of the watercraft 16 on the skid 20 is less than frictional resistance to sliding of the skid 20 upon the bed 12 of the truck 14, so that there is greater movement of the watercraft 16 relative to the skid 20 than there is movement of the skid 20 relative to the truck 14.

Thus, as the winch line 80 is brought back onto the winch 74, it will pull the watercraft 16 up on to the skid 20 and will then pull the skid 20 and the watercraft 16 onto the bed 12 of truck 14, so that the watercraft 16 is supported by the skid 20, and the skid 20 is supported by the truck 14.

When the watercraft 16 is first pulled into engagement with the rear end of skid 20, the tapered nose portion of the watercraft 16 will naturally center itself between the rails 34 and 36 and will then begin to ride up on the first of the cross pieces 54. This natural centering action greatly aids in loading the watercraft 16. Particularly, when there are crosswinds tending to push the watercraft 16 sideways out of engagement with the loading apparatus.

Thus, it is seen that the apparatus of the present invention is much more simple than any of the prior art apparatus which accomplish this same function, and yet it reliably, easily and safely provides a mechanism by means of which an individual can load and unload a heavy personal watercraft into the bed of a conventional pickup truck.

Due to the very simple construction of the present invention, it can be manufactured and sold much more economically than competitive apparatus.

Furthermore, due to its simple construction, there is relatively little maintenance and there is high reliability of the apparatus.

Additionally, the apparatus 10 allows the watercraft 16 to be carried in a very low position only a few inches above the bed of the truck, which makes it much safer to transport watercraft with the present invention as compared to some prior art devices which load the watercraft at a high elevation relative to the truck bed. This low position, providing a low center of gravity of truck and watercraft, is much safer than prior apparatus which carry the watercraft at a higher location.

It is noted that with the loading apparatus of the present invention, it is not necessary to utilize complicated pivotal ramps which are extended in a downward direction from the truck bed to the water. The present invention utilizes the downward sloping orientation of the truck bed itself upon the ground ramp 84, plus the cantilevered extension of the skid to place the rear end of the skid either within the body of water or close enough to the surface of the body of water that the watercraft 16 can be pulled onto the skid.

On a conventional two wheel drive pickup truck, the skid 20 can be made short enough that it can be completely retracted within a standard length pickup truck bed so that the tailgate of the bed can be completely closed.

With other trucks having a four wheel drive, the ground clearance may be higher and it may be necessary to make the skid 20 longer so that even when the skid 20 is in a fully retracted position, it will still extend partially out of the bed of the truck and the tailgate will have to remain open.

It is noted that as the watercraft 16 is pulled up on to the skid 20, the watercraft 16 is oriented generally parallel to the skid 20. This provides a great improvement as contrasted to many prior art apparatus wherein the watercraft must first be pulled up a sloped ramp, and then it tips over a breakline onto a horizontal supporting surface. The point loads which are exerted on the hull of the watercraft when it tips over such a support line can be very high and can tend to damage the fiberglass or plastic hull of the watercraft.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An apparatus for loading a personal watercraft in a bed of a truck, comprising:
    a skid mount connected to the truck, the skid mount including a first guide structure; and
    a skid, movable relative to the skid mount between an extended position and a retracted position, the skid including:
        second guide structure slidably engaging the first guide structure, the inter-engagement of the second guide structure with the first guide structure maintaining the skid substantially parallel to the bed of the truck so that the skid is cantilevered from a rear end of the bed of the truck when the skid is in its extended position; and
        a watercraft support surface, defined on the skid for supporting the watercraft in both the extended and the retracted positions of the skid.

2. The apparatus of claim 1, further comprising:
    a winch attached to the truck and including a winch line for connection to the watercraft.

3. The apparatus of claim 2, wherein the winch includes:
    a base attached to the truck; and
    a post extending up from the base to an elevation approximately equal to that of a tow connection on the watercraft, so that the winch line can extend approximately parallel to the bed of the truck from the post to the tow connection.

4. The apparatus of claim 1, further comprising:
    a first friction reducing bearing between the skid and the bed of the truck.

5. The apparatus of claim 4, further comprising:
    a second friction reducing bearing mounted on the skid for engaging the watercraft, the watercraft support surface being defined on the second friction reducing bearing.

6. The apparatus of claim 5, further comprising:
    a third friction reducing bearing between the skid and the skid mount.

7. The apparatus of claim 5, wherein the friction reducing bearings are constructed of ultra high molecular weight plastic.

8. The apparatus of claim 1, wherein the skid comprises:
    first and second parallel rails; and
    a plurality of cross-bars connecting the first and second rails.

9. An apparatus for loading an article in a bed of a truck, comprising:
    a skid mount constructed to be connected to the truck; and
    a skid constructed to be received by the skid mount including:
        first and second rails, each having an underside and a topside;
        a plurality of cross-pieces connected between the first and second rails;
        first and second strips of friction reducing material mounted on the underside of the first and second rails for engaging the bed of the truck so that the skid can slide upon the bed of the truck; and
        first and second friction reducing supports attached to the topsides of the first and second rails for engaging the article to be loaded so that the article can slide upon the rails.

10. The apparatus of claim 9, wherein the skid mount includes:
    first and second mounting brackets, each including a plate spaced from and generally parallel to the bed of the truck to define a slot within which one of the rails of the skid may be slidably received.

11. The apparatus of claim 10, wherein:
    each of the mounting brackets includes a pad of friction reducing material for engaging its respective associated rail.

12. The apparatus of claim 9, further comprising:
    a winch assembly including a post extending upward from the bed of the truck, and a roller mounted at an upper portion of the post for guiding a winch line.

13. The apparatus of claim 9, wherein:
    the strips of friction reducing material are plastic material.

14. The apparatus of claim 13, wherein the plastic material is an ultra high molecular weight plastic material.

15. The apparatus of claim 9, wherein:
    each of the rails is a right angle shaped structural member with one leg extending parallel to the bed of the truck and having the underside of the rail defined thereon, and having a second leg extending vertically upward so that the topside of the rail is defined by a top edge of the second leg; and
    the friction reducing supports include lengths of round plastic bar attached to the top edges of the second leg of each rail.

16. The apparatus of claim 9, wherein the cross-pieces are constructed of round plastic bar.

17. A method of loading a personal watercraft in a truck comprising:
    (a) providing a loading apparatus including a winch and a skid, the skid being slidably mounted on the truck;
    (b) sliding the skid rearward relative to the truck to an extended position extending past a rear end of the truck, such that in the extended position the skid is cantilevered from the rear end of the truck generally parallel to a bed of the truck;
    (c) connecting a winch line from the winch to the watercraft and thereby:
        (1) pulling the watercraft onto the skid, and
        (2) pulling the skid and the watercraft onto the truck so that the watercraft is supported by the skid and the skid is supported by the truck.

18. The method of claim 17 wherein:
    in step (c)(1), when the watercraft initially engages the skid, frictional resistance to sliding of the watercraft on the skid is less than frictional resistance to sliding of the skid upon the truck so that there is greater movement of the watercraft relative to the skid than there is movement of the skid relative to the truck.

19. The method of claim 17, further comprising:
    prior to step (b), locating the truck on a loading ramp adjacent to a body of water; and
    step (b) includes extending the skid into or near to the surface of the body of water.

* * * * *